June 15, 1943.　　　W. D. WALLACE　　　2,321,717
HARDNESS TESTING MACHINE
Filed Oct. 23, 1939　　　4 Sheets-Sheet 2

INVENTOR.
W. DONALD WALLACE
BY *Whittemore Hulbert + Belknap*
ATTORNEYS

June 15, 1943.    W. D. WALLACE    2,321,717
HARDNESS TESTING MACHINE
Filed Oct. 23, 1939    4 Sheets-Sheet 3

INVENTOR.
W. DONALD WALLACE
BY
ATTORNEYS

INVENTOR.
W. DONALD WALLACE
ATTORNEYS

Patented June 15, 1943

2,321,717

UNITED STATES PATENT OFFICE 2,321,717

HARDNESS TESTING MACHINE

William Donald Wallace, Wayne, Mich., assignor, by direct and mesne assignments, of forty-six and two-thirds per cent to Denes Pataki, thirty-three and one-third per cent to Carl Ross, and twenty per cent to Elmer Strasser Application October 23, 1939, Serial No. 300,849

15 Claims. (Cl. 265—12)

The invention relates to hardness testing machines of that type in which the hardness is measured by the depth of penetration of a penetrator under actuation of a predetermined force. Accuracy in measurement is dependent upon a number of factors, among which are, first, the exact determination of the actuating force. Gravity may be used for this purpose but the magnitude of the force required would necessitate for its generation a relatively large mass for directly actuating the penetrator. To avoid this, a small mass may be used and its force multiplied by leverage. However, this introduces another problem, viz: the variation in the force applied through angular movement of the lever. As a consequence, hardness testing machines of this character are usually only suited for laboratory use where skill in the operator and time is required for properly setting the machine and taking an accurate reading therefrom.

It is a primary object of the instant invention to obtain a hardness testing machine which may be used in connection with mass production of manufactured articles for the rapid and accurate testing of the same and which requires no skill on the part of the operator, other than the usual mechanical skill to run a machine. It is a further object to avoid any inaccuracy due to angular movement in the leverage system and to maintain a constant ratio or a constant advantage therein. A further object is to maintain a constant velocity in the gravity actuated mass throughout a predetermined range of its movement so that the force applied by the penetrator will be the same in various positions of adjustment of the work. A further object is to provide a signal system which informs the operator as to the proper time for introducing the work and also when the machine requires adjustment. A further object is to obtain from the machine a direct reading in the standard units used for indicating the hardness of materials. With these and other objects in view, the invention consists in various features of construction as hereinafter set forth.

Generally described, my improved machine comprises a work holder and a penetrator member mounted for relative reciprocation in a suitable supporting frame and also relatively adjustable for the accommodation of pieces of work of different dimensions. The primary actuating force is obtained from a relatively small oscillatory member of predetermined mass and this force is augmented by a power multiplying lever intermediate said member and the member to be actuated. Furthermore, the velocity of the primary mass is maintained constant during the relative movement of said penetrator and work into contact with each other. To avoid any error due to angular movement of the lever, provision is made for maintaining constant ratio or constant advantage throughout the amplitude of its movement. This is accomplished by a flexible connection between the weight and lever passing about an arcuate shoe on the latter, and by the further provision of an involute bearing engagement between the lever and the actuated member.

Figure 1:
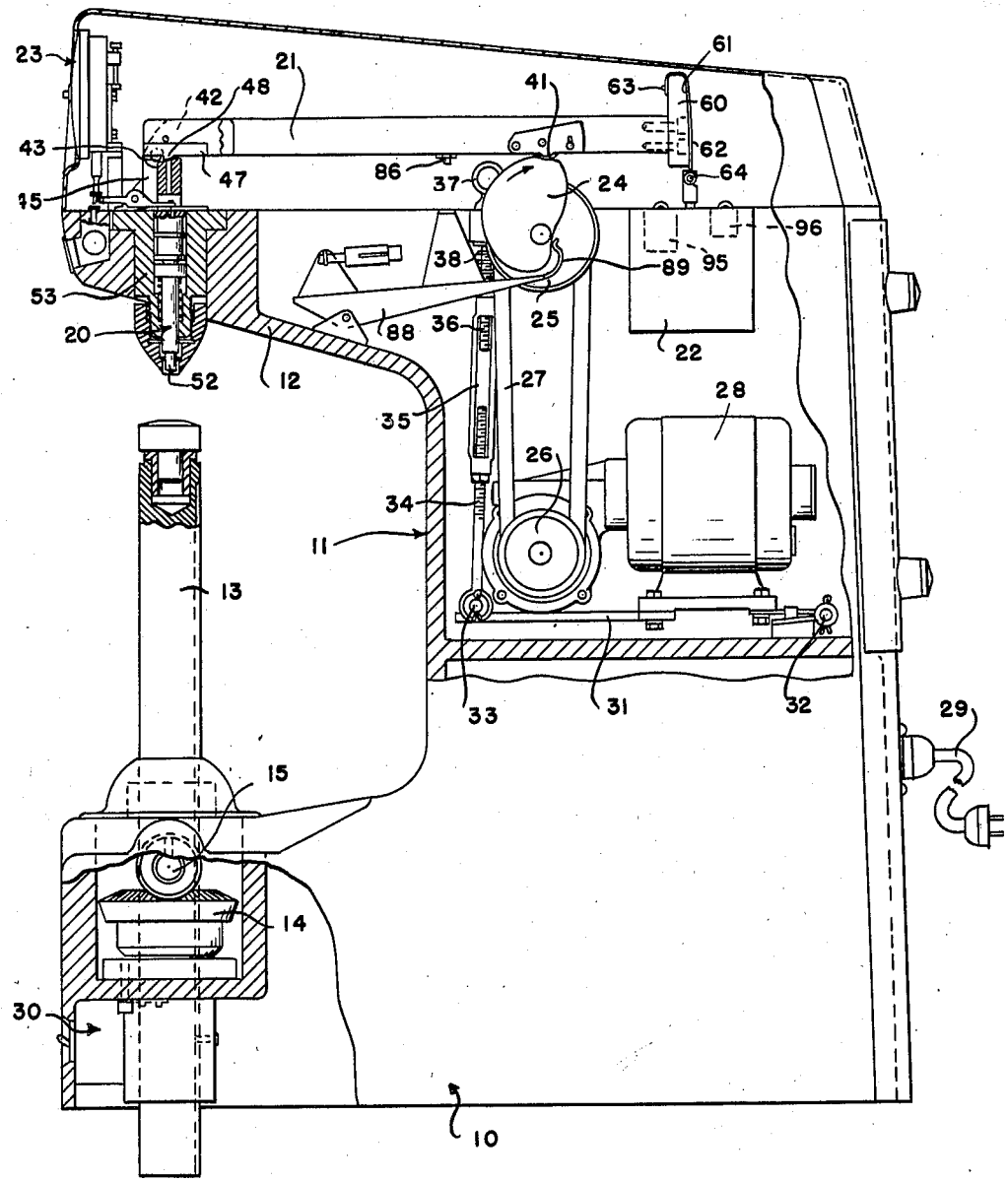
Figure 1 is an assembly view of the hardness testing machine assuming the relative position of the various parts.

In detail and referring to Figure 1, the machine is shown in assembly and consists of a frame having a base indicated generally at 10, a vertical portion 11 and an overhanging portion 12. A work supporting member is shown at 13, this member being adjustable vertically by reason of a suitable screw collar 14, which is turned by a crank rod 15. The penetrator member for the hardness testing machine is shown generally as 20. A lever 21 is provided to apply the force to the penetrator member and on this lever is supported a weight 22. An indicating dial 23 is operatively connected to the penetrator member in a manner which will be described in detail.

The movement of the lever 21 is to be controlled mechanically by a cam 24 which is driven through pulleys 25 and 26 and a belt 27. A motor 28 furnishes the motive power. The motor 28 and a signal, which will be described later, is furnished with electrical energy through a line 29, this energy being controlled by a switch 30, details of which have not been shown.

The motor 28 is mounted on a bar 31 which is hinged at 32 and supported at 33 by an adjustable rod 34. The rod 34 is threaded at its upper end into a turnbuckle 35 and a rod 36 is threaded into the upper end of the turnbuckle, and is provided with an upper finger loop 37. A spring 38 urges the turnbuckle downwardly, thus exerting tension on the belt 27, which connects the pulleys 25 and 26. The pulley 26 consists of three different sized V-belt wheels and is driven directly by the motor 28. The pulley 25 also is formed of three different sized V-belt wheels, and these are arranged with respect to the wheels of the pulley 26, so that there may be varying speed ratios between the two pulleys. If the belt is to be changed from one position to another, this may be accomplished by lifting the finger ring 37 and consequently the turnbuckle 35 against the spring 38. A collar 39, which is below the ring 37, is arranged to cooperate with a spring pressed latch 40, so that when the rod 36 is lifted a predetermined distance, the latch will hold it in this position. The belt may then be changed conveniently and when the latch 40 is released, the spring 38 will move the turnbuckle and the rods down to the belt tensioning position.

A follower 41 on lever 21 rides on the cam 24. The cam 24 is driven by the pulley 25 and is so shaped that as it moves in the direction of the arrow, the lever 21 will be permitted to move downwardly at a uniform rate of speed. At the left end of the lever 21, as viewed in Figure 1, are fastened parallel side plates 42, which toe downwardly and are pivoted (Figure 3) by pins 43 in parallel brackets 45. The pins 43 are maintained in their position by set screws 46. Between the side plates 42 on the end of the lever 21 is mounted an insert 47. This insert is intended to contact the penetrator and is provided with a downwardly projecting portion 48, which has its lower surface shaped as one side of an involute gear tooth.

Figures 3, 6:
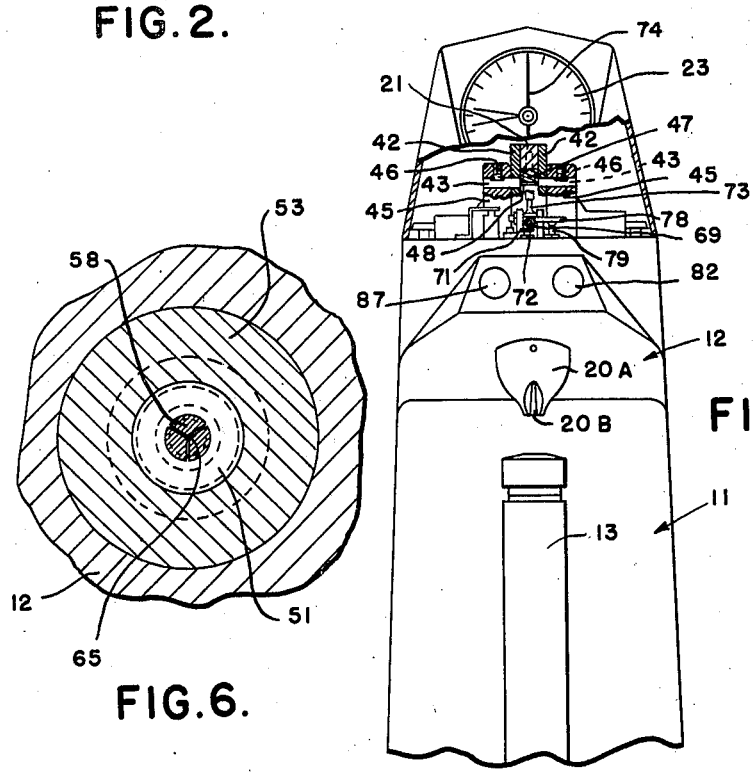
Figure 3 is a partial front elevation of the device.
Figure 6 is a sectional view taken on the line 6—6 of Figure 5.

Referring now to the penetrator which has been indicated generally at 20, it consists of an upper spindle 50, a lower spindle 51 and a penetrator member 52. These spindles are each mounted in a cylindrical opening provided in an insert 53 in the head portion 12. These spindles are slidably mounted in this opening and it will be seen that a shoulder on spindle 51 contacts a spring 54, which rests on the bottom of a shoulder in the insert 53. Thus, the lower spindle 51 is urged upwardly by the spring 54. Each of the spindles 50 and 51 is provided, respectively, with axial recesses 55 and 56. The upper portion of the recess 56 is tapered as shown in the drawings, and in this recess is positioned a split member or clutch 58. This clutch member, shown in section in Figure 6, is provided with a crown top which fits into a recess in the lower portion of the upper spindle 50. It will be seen that a downward force on the spindle 50 toward the spindle 51 will cause a compression or squeezing together of the split elements of the clutch member 58. The upper end of the spindle 50 is shaped at 59 to compare with the contour of the tooth of a rack to be used with an involute spur gear. Thus, the shaped portion 48 of the insert 47 will cooperate with the shaped top of the spindle 50. Surrounding the penetrator mechanism at the lower end, is a guard 20A, which is threaded on a portion of the insert 53. This guard may be adjusted on the insert, and is provided with an opening 20B, so that the operator may view the movement of the penetrator 52.

Force which is applied to the penetrator member made up of spindles 50, 51 and penetrator 52, is obtained by gravity through the weight 22 suspended at the right end of the lever 21. On the end of this lever is a vertical shoe member 60, which has a surface 61 curved on a radius equal to the length of the lever between its point of pivoting and this surface. Wrapped over this surface is a flexible band 62 fastened at 63 to the shoe and at 64 to the weight 22. With this suspension device it will be seen that the force of the weight is always normal to a horizontal line within the limits defined by the size of the shoe member 60.

Referring now to the indicating means of the penetrator, it will be understood that in hardness testing machines of this type two loads are applied to the surface being tested. The first is called a minor load to penetrate superficial surface of the material and the second load is called the major load. The hardness of the metal is indicated by the distance the penetrator enters the metal between the end of the minor load application and the end of the major load. The present machine contemplates a direct reading of the hardness in this way; projecting down through the axial opening 56 in the upper spindle 50 is a fine steel wire 65. This wire projects through a tiny axial recess in the split clutch 58. When the split portions of the clutch are pressed together, the wire 65 will be firmly gripped. The clutch is so arranged that at a predetermined pressure it will close on the wire 65. The upper end of the wire 65 is fastened securely in one end of a lever 66 pivoted at 67. A spring 68 urges the right end of this lever upwardly, as shown. This end of the lever passes into a transverse passage 50A, which is so dimensioned that the lever will not contact the penetrator spindle 50. The other end of the lever is provided with a screw member 69 and a lock nut 70 maintains this member in any adjusted position. An adjustable screw 71 held in position by a lock nut 72 limits the downward movement of the left end of the lever 66. The screw member 69 is intended to form a contact member for a dial plunger 73, projecting downward from a dial which has been indicated generally at 23. On the dial 23 is mounted a needle 74, which is operatively connected with the dial plunger 73 by suitable means, which is not shown. The dial member 23 is movably mounted on a bracket 75, and a screw member 76 passing through a threaded stud 77 and anchored in the bracket 75, permits a coarse adjustment of the dial 23. A further adjustment of the dial is provided by a small table 78, shown in Figure 3. This table is adjustable vertically by a screw 79 and limits the downward motion of the dial plunger 73. The dial plunger may thus be located at zero by the adjustment of the table 78.

Figure 2:
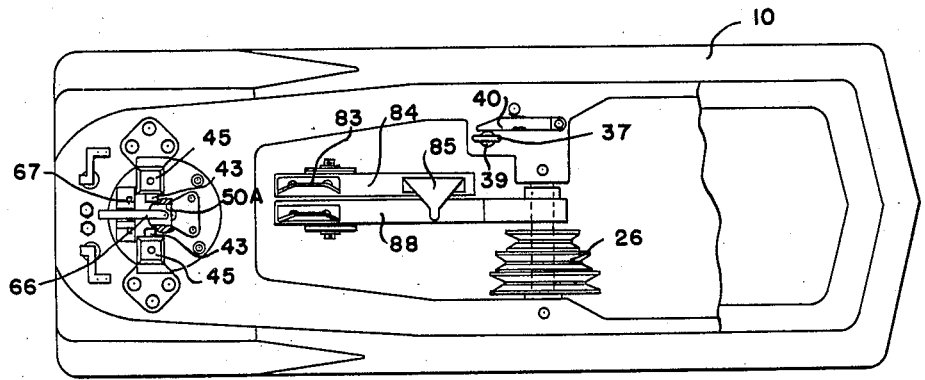
Figure 2 is a plan view of this assembly with certain parts removed.

One of the features of the present invention has to do with the maintaining of the mechanical advantage of the lever 21 at a constant within predetermined limits of movement of the lever up and down. It will be seen that with an ordinary lever, where the weight is simply pivoted to one end, there will be a change in the effective lever length as the weight is lowered. With the present contact arrangement between the lever and the penetrator and the novel supporting of the weight 22, the effective length of the lever 21 is constant within the certain limits of movement thereof. In order that the machine will operate successfully, it is essential that there be some sort of signal means devised, which will indicate when the lever is acting within its normal and necessary limits. For this purpose a signal light 82 is provided in the front of the machine (Figure 3). A mercury switch indicated at 83 is mounted on a pivoted lever 84 (Figure 2). Projecting upwardly from this lever is a contact member 85 which will be contacted by an adjustable bolt 86 on the lever 21 in case the lever is lowered beyond a predetermined point. When the bolt 86 contacts the member 85 the mercury switch 83 will be moved to a point where the light 82 will be furnished with electrical energy, and thus call the attention of the operator to the fact that the work support member 13 is too low.

It will also be seen that if the present machine is to be used in production, some type of signal should be provided so that the operator may know when to insert and remove work from the holder. A second signal light 87 is provided and the lighting of this signal is controlled by a pivoted lever 88 which has a follower 89 contacting the cam 24. A spring 90 urges the lever against the cam. Mounted on this lever is also a mercury switch 91, and this switch is arranged so that the signal 87 will be lighted when the lever 21 is approaching its highest position, and will remain lighted until the lever has started on its downward movement. During the lighted period of signal 87, the operator may remove the tested work from the holder 13 and insert a new piece.

Figure 4:
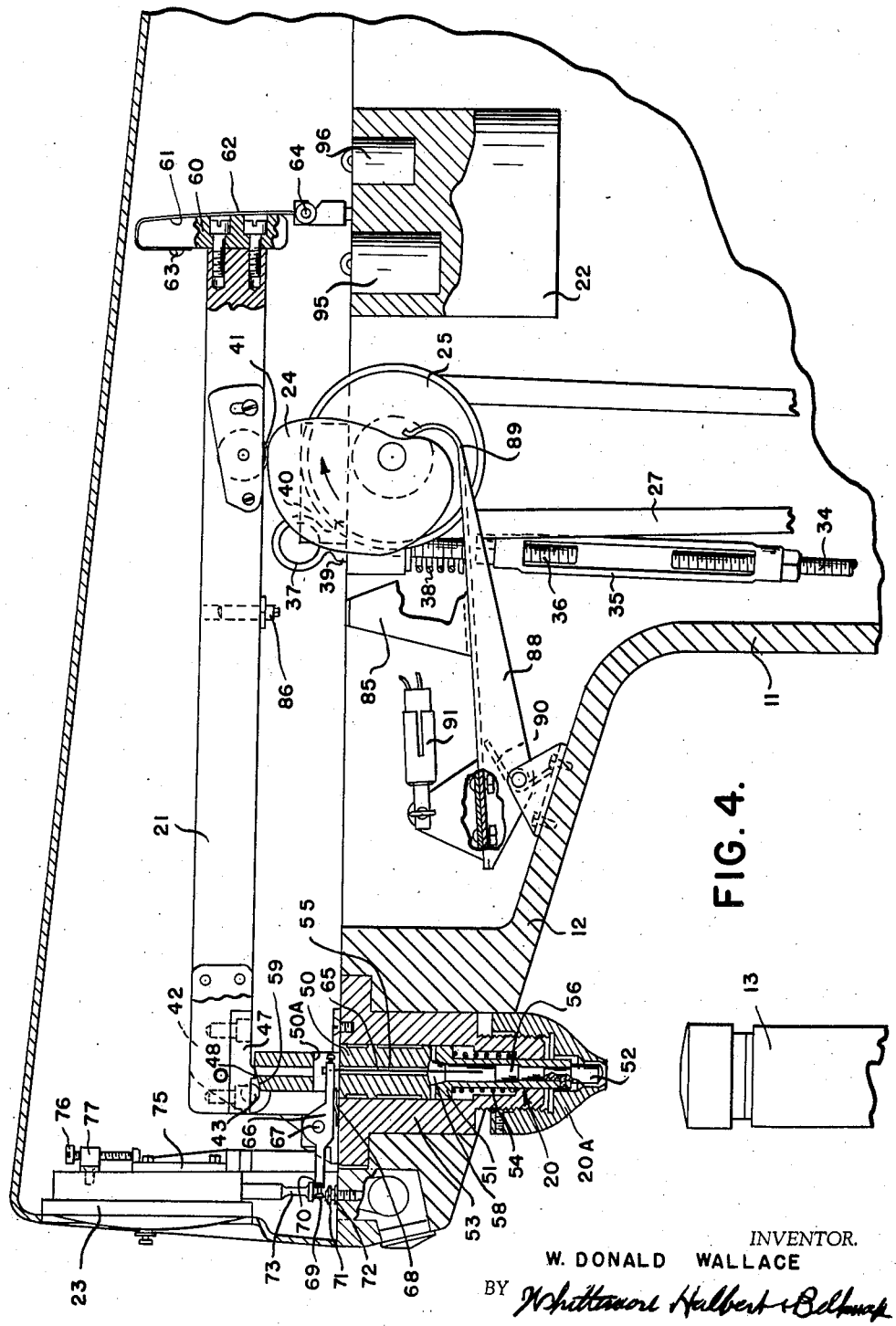
Figure 4 is an enlarged sectional view of a portion of the assembly, illustrating the details thereof.
Figure 5:
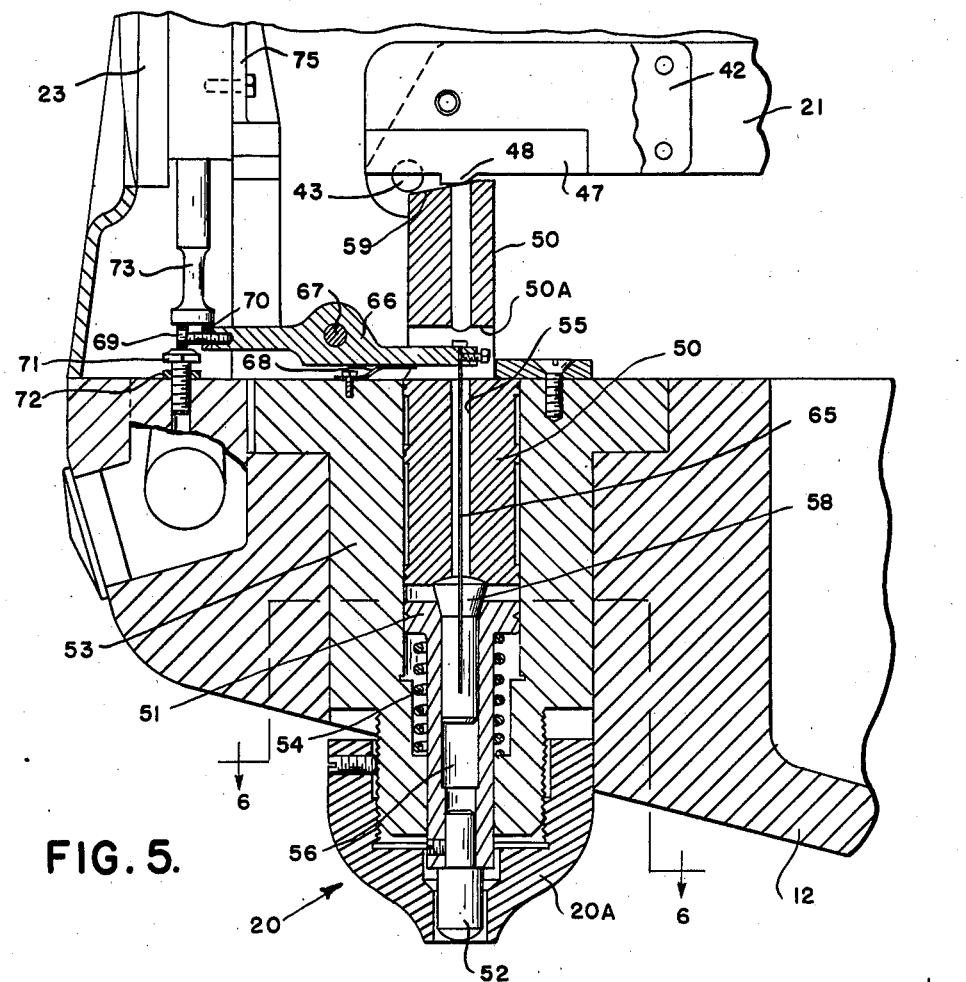
Figure 5 is an enlarged sectional view of a portion of the assembly showing particularly the penetrator member.
Figure 7:
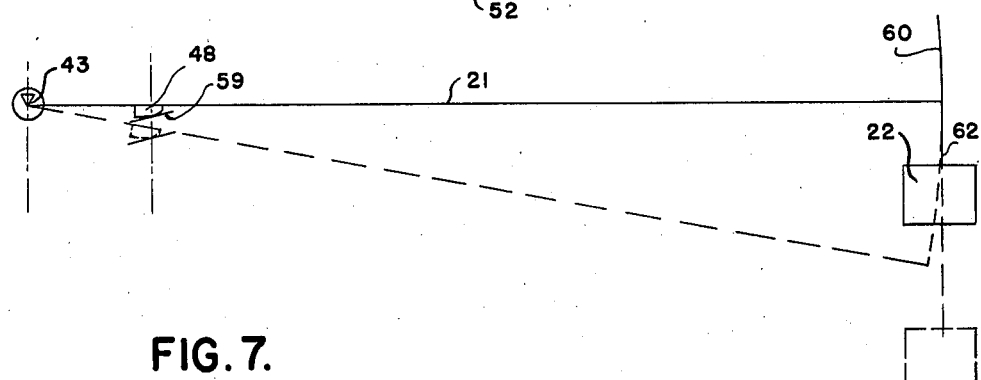
Figure 7 is a diagrammatic presentation of the lever and the load application elements, illustrating the principles of the present design.

As viewed in Figures 1 and 4, it will be seen that the weight 22 is provided with inserts 95 and 96, which will permit compensating of the weight for increases of speed of operation. For example, if the machine is set at its lowest speed, it will not perform properly at the second or third higher speeds, because of the fact that there will be a change in the velocity of movement of the weight which will change the effective force on the penetrator. This may be compensated for by removing the weights 95 and 96 respectively. These weights are calibrated to compensate accurately for changes in the velocity of the weight 22.

In the operation of the device, assuming that it is properly adjusted and calibrated and a test piece is held in the work holder 13, as the penetrator 52 descends, due to revolution of the cam 24 and consequent lowering of the lever 21, the upper spindle 50 is forced down against the lower spindle 51. This will carry the penetrator 52 to the work specimen and will partly compress the return spring 54. The movement of the penetrator 52 into the work is resisted by the work until sufficient force is applied on it to close the clutch 58. The force required to close this clutch on the pull wire 65 is only a small portion of the force generated by the weight 22, and the impression on the test specimen is relatively small. This force may be accurately determined and controlled, and comprises the minor load force. As the upper spindle 50 continues on its downward movement, forcing the penetrator 52 into the work, it will be seen that the closed condition of the clutch 58 will cause the wire 65 also to move downwardly. This will effect movement of the lever 66 and consequently the dial plunger 73 will register a movement of the needle 74 on the dial. This movement may be readily checked by the operator and the movement will indicate the exact distance the penetrator has entered the test piece due to the major load.

In certain applications, depending on the hardness of the metal being tested, different dials are used. On these dials, in some cases, the sweep of the needle is different. On the present machine, this may be adjusted by movement of the contact member 69 which may be moved in or out of the lever 66. Change in the length of the lever arm will cause a change in the movement of the dial plunger 73, and thus a change in the sweep of the needle.

The purpose of the adjusting screws 69 and 71 is to facilitate the accurate setting of the gauge or indicator so as to give a correct reading. After the dial member 23 is secured in position on the bracket 75, the screw 79 is adjusted to raise or lower the small table 78 so as to move the plunger 73 and set the needle 74 at zero. The screw 71 is then adjusted to raise the left end of the lever 66 so as to contact the head of the screw 69 with the plunger 73. Thus any further movement of the lever under actuation of the penetrator member will be accurately registered on the dial. The adjustment of the screw 69 is for a slight change in the ratio of the arms of the lever 66 to adjust the movement in correspondence with the calibration of the dial. These screws 69 and 71, after adjustment, are locked from displacement by the nuts 70 and 72.

What I claim as my invention is:

1. A hardness testing machine comprising a work supporting member and a penetrator member movable one toward the other so as to bring the work and penetrator into contact, an oscillatory member of predetermined mass, a constant ratio power multiplying leverage between said oscillatory member and one of the aforesaid members, and means for maintaining substantially constant velocity in said oscillatory member during the relative movement of said penetrator and work toward each other into contact.

2. A hardness testing machine comprising a work supporting member and a penetrator member movable one toward the other so as to bring the work and penetrator into contact, a substantially vertically oscillating member of predetermined mass actuated in its downward phase by gravity, a constant ratio power multiplying leverage between said oscillating member and one of the aforesaid members for moving said penetrator and work into contact during the downward movement of the oscillating member, and means for limiting the gravity actuated downward movement of said oscillating member to a substantially constant velocity while said penetrator and work are relatively moving into contact.

3. A hardness testing machine comprising a work supporting member and a penetrator member movable one toward the other in a fixed path so as to bring the work and the penetrator into contact, and means for applying force to one of said members comprising a weight of predetermined mass, a power multiplying lever between said weight and the member to which force is to be applied fulcrumed in fixed relation to said path, and means for maintaining within predetermined limits of movement of said lever a constant mechanical advantage.

4. A hardness testing machine comprising a work supporting member, a penetrator member movable in a fixed path toward said work supporting member, means for applying a load to said penetrator member comprising a substantially horizontal lever having a fulcrum in a fixed relation to said path and also having involute gear contact with said penetrator member, and a weight acting on said lever supported by a flexible member passing over an arcuate shoe whereby the mechanical advantage of said lever acting on said penetrator will be constant within predetermined limits of movement of said lever.

5. A hardness testing machine comprising a work supporting member, a penetrator member movable in a fixed path toward said work supporting member, said penetrator member having a surface formed as a portion of tooth on an involute gear rack, and means for applying a load to said penetrator comprising a substantially horizontal lever, a formation on said lever in the shape of a portion of an involute gear tooth for contacting the tooth portion of said penetrator, a weight acting on said lever, and means for supporting said weight comprising a shoe member supported on said lever having a surface curved on a radius equal to the effective length of said lever when horizontal, and a flexible member fastened at one end to said weight and passing over said shoe member whereby the effective length of said lever acting on said penetrator will be constant within predetermined limits of movement of said lever.

6. A hardness testing machine comprising a work supporting member and a penetrator member movable one toward the other in a fixed path so as to bring the work and penetrator into contact, and lever means for applying a constant gravity force to one of said members fulcrumed in fixed relation to said path and unaffected by the angular movement of said lever means.

7. A hardness testing machine comprising a work supporting member, a penetrator member movable in a fixed path toward said work supporting member, means for applying a load to said penetrator member comprising a substantially horizontal lever having involute gear contact with said penetrator member and a weight acting on said lever supported by a flexible member passing over an arcuate shoe whereby the mechanical advantage of said lever acting on said penetrator will be constant within predetermined limits of movement of said lever, and means for oscillating said lever comprising a rotary cam fashioned to maintain constant velocity of said penetrator member while approaching the work.

8. A hardness testing machine comprising a work supporting member, a penetrator member movable toward said work supporting member, means for applying a load to said penetrator member comprising a substantially horizontal lever having involute gear contact with said penetrator member and a weight acting on said lever supported by a flexible member passing over an arcuate shoe whereby the mechanical advantage of said lever acting on said penetrator will be constant within predetermined limits of movement of said lever, a means for causing movement of said lever comprising a motor, a cam driven by said motor, a follower on said lever adapted to contact said cam, said cam being so shaped that the weight will be moved downwardly at a uniform velocity for a predetermined distance to cause an application of a predetermined force on said penetrator member, and signal means operatively connected to said driving mechanism for indicating predetermined points in the operation of said lever.

9. A hardness testing machine comprising a work supporting member, a penetrator member movable toward said work supporting member, means for applying a load to said penetrator member, and an indicating means operatively connected with said penetrator comprising a dial indicator, an actuating member therefor, a lever between said penetrator member and said actuating member disconnected from the former during a portion of its movement, an adjustable stop for limiting the outward movement of said actuating member, and adjustment means for maintaining said lever in operative relation to said actuating member in each position of adjustment of said stop.

10. A hardness testing machine comprising a work supporting member, a penetrator member movable toward said work supporting member, means for applying a load to said penetrator member, and an indicating means operatively connected with said penetrator comprising a dial indicator, an actuating member therefor, a lever between said penetrator member and said actuating member disconnected from the former during a portion of its movement, an adjustable stop for limiting the outward movement of said actuating member, and adjustment means for maintaining said lever in operative relation to said actuating member in each position of adjustment of said stop, said adjustment means including an adjustable stop for said lever, and means for adjusting the ratio of said lever.

11. A hardness testing machine comprising a work supporting member and a penetrator member movable one toward the other so as to bring the work and the penetrator into contact, means for applying force to one of said members, and means for indicating relative movement between said members as a result of application of force to one of them, comprising a visible movable indicator, a shiftable member operably connected to said indicator, adjustable means for limiting the movement of said shiftable member in one direction, a lever arranged to have one portion responsive to relative movement between said work supporting member and said penetrator member and arranged to have a contact portion for contacting said shiftable member, said contact portion being movable toward or away from the fulcrum of said lever to change the ratio thereof and consequently the effect on said shiftable member.

12. A hardness testing machine comprising a work supporting member and a penetrator member movable one toward the other so as to bring the work and the penetrator into contact, means for applying force to one of said members, and means for indicating relative movement between said members as a result of application of force to one of them, comprising a visible movable indicator, a shiftable member operably connected to said indicator, a lever arranged to have one portion responsive to relative movement between said supporting member and said penetrator member and arranged to have a contact portion for contacting said shiftable member, said contact portion being movable toward or away from the fulcrum of said lever to change the ratio thereof and consequently the effect on said shiftable member, an adjustable stop for limiting the movement of said shiftable member, and means for adjusting said lever to maintain the same in operative relation to said shifting member in each position of adjustment of said stop.

13. A hardness testing machine comprising a work supporting member, a penetrator member movable toward said work supporting member, a substantially horizontal lever for applying force to said penetrator member, weight means connected to said lever for effecting the application of said force, and means for controlling the movement of said lever comprising a constant velocity cam, a follower on said lever for contacting said cam, a constant angular velocity driving means for said cam, a change speed transmission between said driving means and cam for changing the relative velocity of the latter, and means for controlling the mass of said weight means to compensate for changes in velocity thereof to maintain a constant load on said penetrator member.

14. In a hardness testing machine, a work supporting member, a penetrator member movable toward said work supporting member, a substantially horizontal lever for applying force to said penetrator member, weight means connected to said lever for effecting the application of said force, and means for controlling the position of said lever comprising a constant velocity cam, a follower on said lever adapted to contact said cam, a constant angular velocity driving means for said cam, a change speed transmission between said driving means and cam to change the velocity of the latter, and means for controlling the mass of said weight means to compensate for changes in velocity thereof to effect a constant initial load on said penetrator member, said last named means comprising removable and replaceable weight portions.

15. A hardness testing machine comprising a frame, a lever fulcrumed on said frame, a plunger actuated by said lever, a bearing on said frame in fixed relation to the fulcrum of said lever and in which said plunger is slidable, a work supporting member and a penetrator member, one carried by said plunger and the other by said frame, an involute bearing engagement between said lever and plunger for maintaining the same effective length between said fulcrum and bearing during angular movement of the lever, a weight for actuating said lever, and a suspension connection for said weight from said lever adapted to maintain the same effective length during angular adjustment.

WILLIAM DONALD WALLACE.